Aug. 30, 1966    M. W. STANLEY    3,269,146
LIGHTWEIGHT HOLLOW DRIVE SHAFT ASSEMBLY
Filed Jan. 25, 1963

INVENTOR.
MAX W. STANLEY
BY
ATTORNEYS 3,269,146
LIGHTWEIGHT HOLLOW DRIVE SHAFT ASSEMBLY

Max W. Stanley, Fairfield, Ohio, assignor to the United States of America as represented by the Secretary of the Air Force
Filed Jan. 25, 1963, Ser. No. 254,824
6 Claims. (Cl. 64—1)

This invention relates to hollow torque transmitting shafts and, more particularly, to thin-wall shafting operating in an environment wherein the shaft is subjected to external ambient pressure.

Although not limited to such use, and for purposes of illustration, a typical hollow shaft assembly made in accordance with this invention finds application on high speed axial flow machines such as turbojet engines. Such a shaft may be used to connect the compressor and turbine sections in the general area of the combustion section of the engine.

On a typical turbojet engine, the hollow shaft connecting the compressor and turbine sections is in the general form of a truncated cone, with the base of the cone joined to the compressor section. Combustion cans on such an engine are circumferentially spaced in the area between the shaft and the engine case structure. High pressure compressed air, leaving the final stage of the compressor, expands through the combustion cans and through the increasing volumetric flow area as formed by the decreasing diameter hollow shaft of this invention.

For aerodynamic reasons, or for other reasons not constituting a part of or affecting this invention, the inside of the hollow shaft is at a pressure much lower than the pressure of the compressor air flowing on the outside of the shaft.

This pressure differential between the inside and outside of the shaft often requires the use of a shaft heavier than would be otherwise required to transmit the torque produced by the turbine, in order to have enough wall rigidity to resist the deflecting tendency of the pressure differential acting on the shaft. This pressure differential acts on the shaft only at times when the engine is in operation.

A primary object of this invention is to provide the lightest possible hollow shaft capable of transmitting a given torque, yet capable of resisting the deflecting effect of external ambient pressure.

Another object of this invention is to provide a dual-element hollow shaft having an outer torque transmitting element and an inner support element supporting the outer structure under the action of centrifugal force.

A further object of this invention is to provide a dual element hollow shaft having an inner centrifugal support element utilizing to a great extent the structural shape of the inner centrifugal support element to support the outer element while the two elements are rotating at high speed.

Additional objects, advantages and features of the invention reside in the construction, arrangement and combination of parts involved in the embodiment of the invention as will appear from the following description and accompanying drawing, wherein.

Figure 1:
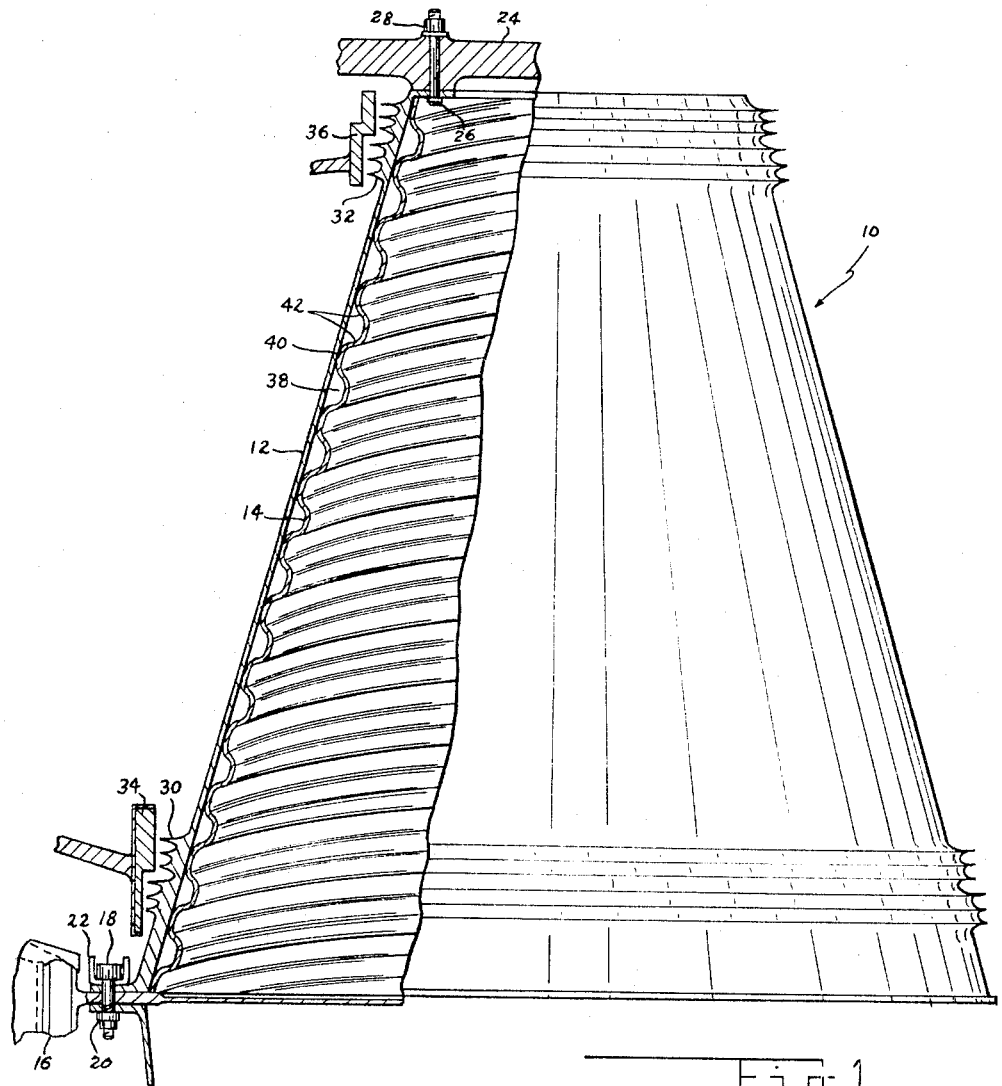
FIG. 1 is a side view of the drive shaft assembly partially in section to show the relationship between the outer and inner elements, and showing one embodiment of the inner element having spiral flutes coaxial with the axis of rotation.

Referring to FIG. 1 of the drawing, the drive shaft assembly 10 has an outer solid wall torque transmitting structure referred to as outer structure 12 and an inner structure 14, the outer wall surface of which is in supporting proximity contact with the inner wall surface of the outer structure.

The drive shaft assembly 10 is shown connected to fragmentary elements of an engine such as previously described. The large end of the outer structure is flanged and is joined to the final stage rotating element 16 of the engine compressor by means of a plurality of bolts 18 and nuts 20; the heads of the bolts being held against rotation by retainer 22.

The small end of the outer structure is likewise flanged and joined to the turbine wheel 24 by a plurality of bolts 26 and nuts 28. The inner structure is nested within the outer structure where it is axially retained by the final stage compressor rotating element 16. If desired, the retention may be by other means such as pins or spot welding. Joined to the outside of the outer structure are the male elements 30 and 32 rotating in stationary rings 34 and 36; providing labyrinth seals between the compressor and turbine sections of the engine in the well known manner. Rings 34 and 36 are supported by the stationary outer portion of the engine.

The inner structure 14, which may be made of material thinner than the outer structure, is constructed with a plurality of flutes 38 concentric with the axis of rotation and providing a plurality of contact surfaces 40 between flutes and a plurality of side walls 42 at an angle to the general outer surface of said inner structure 14. The flutes, as shown, are spiral or helical. The flutes could be made in the form of a series of circles, or could be made linear.

Figure 2:
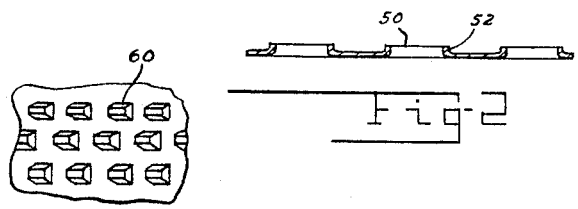
FIG. 2 is a fragmentary cross section of a second embodiment of the inner element made of material which is pierced and turned to provide structural rigidity.

In operation, as the shaft assembly rotation increases and the ambient pressure on the outside increases, centrifugal force increasingly forces the thin inner structure against the outer structure. The side walls 42 of the inner structure, because of their structural relationship to the deflection tendency of the outer structure, provides support against the deflection tendency of the outer structure. Because of this structural advantage applied in the necessary direction, the drive shaft assembly 10 may be made of material having a lower combined weight than would be the weight of a single shell hollow shaft capable of transmitting a given torque while resisting the deflecting tendency of a given outside ambient pressure. If desired, the inner structure may be formed in a manner of which FIG. 2 is representative. The inner structure is pierced with a series of holes 50 and the edges turned to provide side walls 52 parallel to the holes so pierced. In order to avoid bend lines, the holes on successive lines should be staggered in the manner of the dimples shown on FIG. 3.

Figure 3:
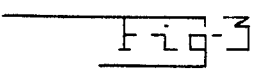
FIG. 3 is a fragmentary view of a third embodiment of the inner element made of a material which is dimpled to provide structural rigidity.

FIG. 3 depicts still another method of providing stiffness to the inner structure. This structure is formed in a manner similar to that shown on FIG. 2 except that instead of piercing the material, it is dimpled as by dimples 60. The dimples, which are preferably staggered to avoid bend lines, may be conical, elliptical, rectangular, waffle iron, or any other convenient form.

It is to be understood that the embodiments of the present invention as shown and described are to be regarded as illustrative only and that the invention is susceptible to variations, modifications and changes within the scope of the appended claims.

I claim:

1. In an axial flow machine, a hollow drive shaft assembly operable in an area under high ambient pressure on the outside, and a lower pressure on the inside of said drive shaft assembly comprising: a solid wall hollow outer structure joinable at each end to a rotating element of said machine for transmitting torque at high speed from one of the said rotating elements to the other rotating element; and a hollow inner structure having a plurality of flutes with sidewalls at an angle to the general outer wall surface of said inner structure, the outer wall surface between the flutes being in proximity with the inner wall surface of said outer structure and supporting, through the effect of centrifugal force during high speed rotation, the said outer structure against the inwardly deflecting influence of the external ambient pressure.

2. In an axial flow machine, a hollow drive shaft assembly operable in an area under high ambient pressure on the outside, and a lower pressure on the inside of said drive shaft assembly comprising: a solid wall hollow outer structure in the form of a truncated cone and having flanges at each end for joining two rotating elements of said machine for transmitting torque at high speed from one of said rotating elements to the other rotating element; and a hollow inner structure nested within said outer structure, the outer wall surface of which is in proximity with the inner wall surface of said outer structure and supporting, through the effect of centrifugal force during high speed rotation, the said outer structure against the inwardly deflecting influence of the external ambient pressure.

3. In an axial flow machine, a hollow drive shaft assembly operable in an area under high ambient pressure on the outside, and a lower pressure on the inside of said drive shaft assembly comprising: a solid wall hollow outer structure in the form of a truncated cone and having flanges at each end for joining two rotating elements of said machine for transmitting torque at high speed from one of said rotating elements to the other rotating element; and a hollow inner structure nested within said outer structure, said inner structure having a plurality of flutes with sidewalls at an angle to the general outer wall surface of said inner structure, the outer wall surface between the flutes being in proximity with the inner wall surface of said outer structure and supporting, through the effect of centrifugal force during high speed rotation, the said outer structure against the inwardly deflecting influence of the external ambient pressure.

4. In an axial flow machine, a hollow drive shaft assembly operable in an area under high ambient pressure on the outside, and a lower pressure on the inside of said drive shaft assembly comprising: a soild wall hollow outer structure in the form of a truncated cone and having flanges at each end for joining two rotating elements of said machine for transmitting torque at high speed from one of said rotating elements to the other rotating element; and a hollow inner structure nested within said outer machine, said inner structure having spiral flutes concentric with the axis of rotation and with sidewalls at an angle to the general outer wall surface of said inner structure, the outer wall surface between the flutes being in proximity with the inner wall surface of said outer structure and supporting, through the effect of centrifugal force during high speed rotation, the said outer structure against the inwardly deflecting influence of the external ambient pressure.

5. In an axial flow machine, a hollow drive shaft assembly operable in an area under high ambient pressure on the outside, and a lower pressure on the inside of said drive shaft assembly comprising: a solid wall hollow outer structure in the form of a truncated cone and having flanges at each end for joining two rotating elements of said machine for transmitting torque at high speed from one of said rotating elements to the other rotating element; and a hollow inner structure nested within said outer structure, said inner structure having a plurality of holes with the edges thereof turned at an angle to the general outer wall surface of said inner structure, the outside surface between holes being in proximity with the inner wall surface of said outer structure and supporting, through the effect of centrifugal force during high speed rotation, the said outer structure against the inwardly deflecting influence of the external ambient pressure.

6. In an axial flow machine, a hollow drive shaft assembly operable in an area under high ambient pressure on the outside, and a lower pressure on the inside of said drive shaft assembly comprising: a solid wall hollow outer structure in the form of a truncated cone and having flanges at each end for joining two rotating elements of said machine for transmitting torque at high speed from one of said rotating elements to the other rotating element; and a hollow inner structure nested within said outer structure, said inner structure being dimpled and in proximity with the inner wall surface of said outer structure and supporting, through the effect of centrifugal force during high speed rotation, the said outer structure against the inwardly deflecting influence of the external ambient pressure.

References Cited by the Examiner

UNITED STATES PATENTS

| | | | |
|---|---|---|---|
| 259,893 | 6/1882 | Miles | 64—1 |
| 1,734,268 | 11/1929 | Moorhouse | 64—1 |
| 2,751,765 | 6/1956 | Rowland et al. | 64—1 |
| 2,794,319 | 6/1957 | Stockdale | 60—35.6 |
| 2,922,278 | 1/1960 | Szydlowski | 60—35.6 |
| 2,933,886 | 4/1960 | Sharma | 60—35.6 |
| 2,938,333 | 5/1960 | Wetzler | 60—35.6 |
| 3,099,141 | 7/1963 | Garten et al. | 64—1 |

FOREIGN PATENTS

| | | |
|---|---|---|
| 489,312 | 7/1938 | Great Britain. |

FRED C. MATTERN, JR., *Primary Examiner.*

SAMUEL FEINBERG, *Examiner.*

R. F. STAHL, H. C. COE, *Assistant Examiners.*